INVENTOR.
ROGER BIHLER
ATTORNEYS

INVENTOR.
ROGER BIHLER
BY
James and Franklin
ATTORNEYS

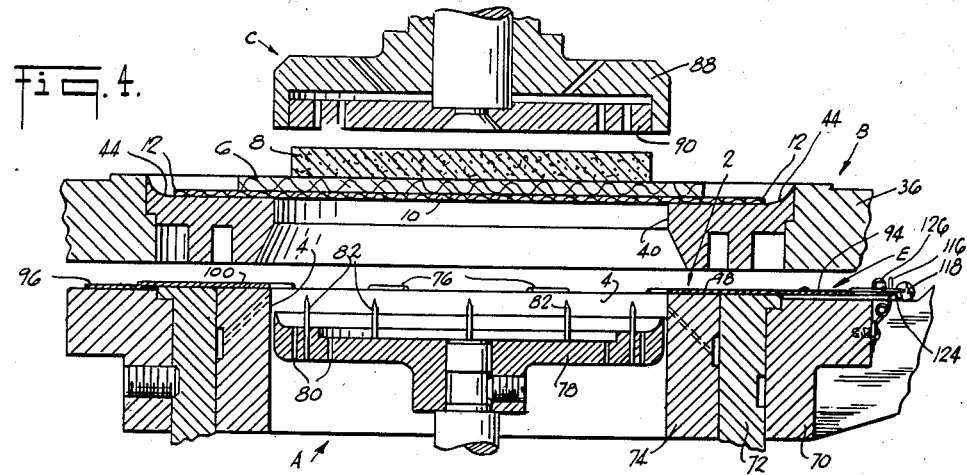
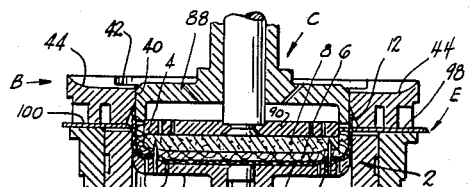
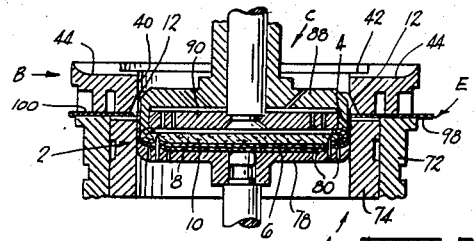
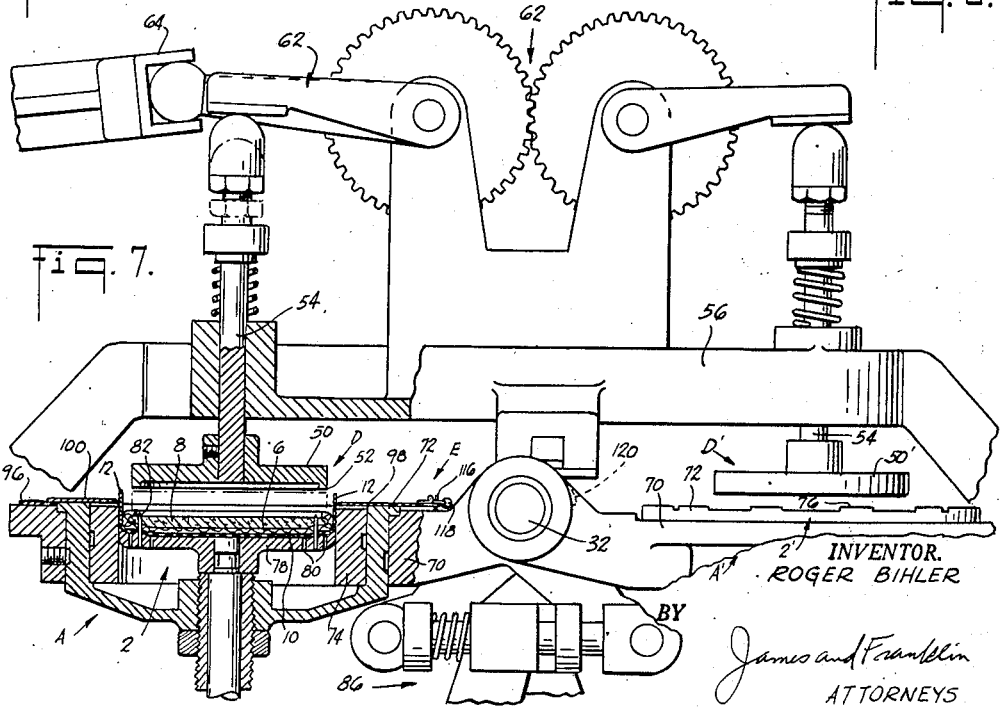

Oct. 19, 1954   R. BIHLER   2,692,221
METHOD FOR MANUFACTURING POWDER PUFFS AND SIMILAR COMPOSITE
ARTICLES WITH A RIBBON INCORPORATED THEREIN
Original Filed July 18, 1951   4 Sheets-Sheet 4
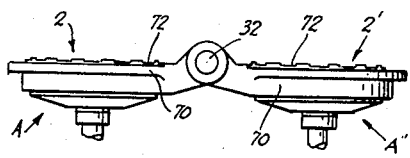
Fig. 8A.
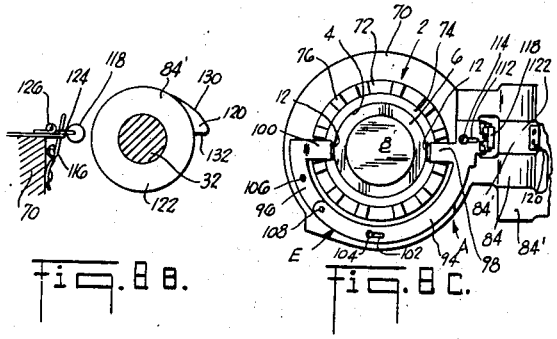
Fig. 8B.   Fig. 8C.
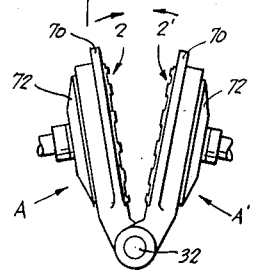
Fig. 9A.
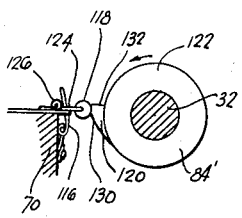
Fig. 9B.
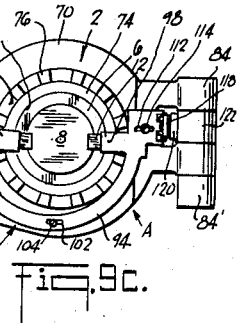
Fig. 9C.
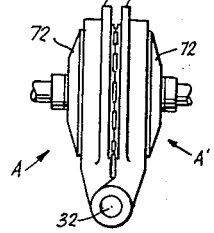
Fig. 10A.
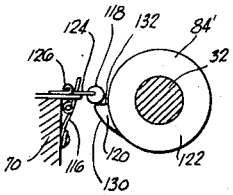
Fig. 10B.
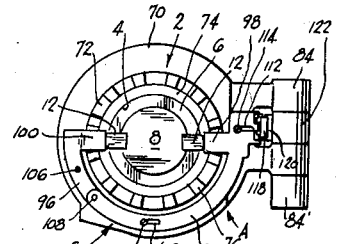
Fig. 10C.
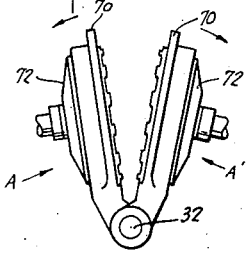
Fig. 11A.
Fig. 11B.
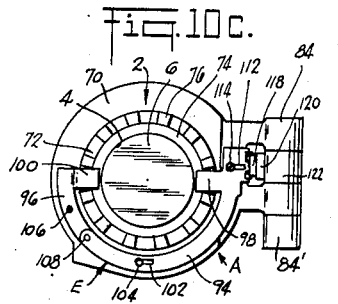
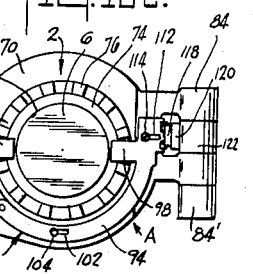
Fig. 11C.
INVENTOR.
ROGER BIHLER
BY
James and Franklin
ATTORNEYS Patented Oct. 19, 1954

2,692,221

UNITED STATES PATENT OFFICE 2,692,221

METHOD FOR MANUFACTURING POWDER PUFFS AND SIMILAR COMPOSITE ARTICLES WITH A RIBBON INCORPORATED THEREIN

Roger Bihler, Brentwood, N. Y., assignor to Victoria Vogue, Inc., New York, N. Y., a corporation of New York Original application July 18, 1951, Serial No. 237,444. Divided and this application December 24, 1952, Serial No. 327,865

6 Claims. (Cl. 154—117)

The present invention relates to a method for manufacturing and assembling shaped articles from blanks, said articles having incorporated therein a ribbon or similar strip of material, and in particular to a method for manufacturing powder puffs from a pair of such blanks secured together in abutting relationship and a ribbon strip, the ribbon extending across one face of the completed powder puff and the ends of said ribbon being secured between said blanks. This application is a division of my application Ser. No. 237,444, filed July 18, 1951, and entitled "Apparatus and Method for Manufacturing Powder Puffs and the Like with a Ribbon Incorporated Therein."

In application Serial No. 178,234 of Roger Bihler and Sidney R. Bell, filed August 8, 1950, and entitled "Machine for Manufacturing Powder Puffs and the Like," and assigned to the assignee of the instant application, an organized machine is disclosed which is adapted to efficiently, expeditiously and automatically form and assemble two individual blanks into a completed powder puff. As there disclosed, no means are provided for the incorporation into the finished powder puff of a ribbon attachment. The present invention, in its more specific aspects, constitutes an improvement over the method of assembly which said machine embodies, the improvement being directed to the incorporation therein of method for manipulating ribbon segments or segments of other strip material so as to produce a powder puff in which said ribbon or other strip material extends across one face of the powder puff. However, in its broader aspects the present invention, although here disclosed specifically with respect to a machine of the type disclosed in the aforementioned application, could be used with or be incorporated into machines of other types.

It is generally desirable from a commercial point of view that a powder puff have incorporated thereinto a ribbon or strip, preferably extending across one face of the finished puff, not only for decorative reasons, but also to facilitate manipulation of the puff. It therefore is of significance to provide a method and apparatus for manufacturing powder puffs or similar articles in which such a ribbon may be automatically incorporated. In prior art puffs such ribbons are generally incorporated through the employment of stitching, thus requiring a time consuming hand operation (or a pair of operations, since ordinarily both ends of the ribbon must be attached to the puff) which not only greatly reduces the rate at which such puffs may be produced but also adds materially to the cost of manufacture thereof.

The present invention provides a method by means of which ribbons may be incorporated into powder puffs or similar articles in a fully automatic manner and by the use of adhesive. In its broad aspects, the method involves associating a ribbon with one of the blanks which ultimately is to be a part of the completed powder puff, forming, shaping and applying adhesive to the powder puff blanks substantially independently of the ribbon, and then, before the two blanks are pressed together so as to unite them, folding the ends of the ribbon between the blanks so that the ribbon will be securely fastened to the mating parts of the completed powder puff. This particular method, in which adhesive is applied to both of the blanks before the ends of the ribbon are folded over the blank with which the ribbon is associated, provides for layers of adhesive on both sides of the ribbon ends. The method could also be carried out by folding the ends of the ribbon inwardly before the application of adhesive, but with such a method the ribbon will not be adhesively attached to the blank to which it is associated, and hence will be more liable to be separated from the puff.

Apparatus is here disclosed which, fully automatically and without requiring any attention from the operator of the machine, will fold the ribbon ends over the blank with which the ribbon is associated at the desired time in the sequence of assembling operations. This apparatus comprises a pair of fingers mounted on the die element into which one blank and the ribbon associated therewith is inserted, the fingers assuming an inoperative position outside the open mouth of the die element and opposite those end portions of the ribbon which extend beyond the blank with which the ribbon is associated, and an operative position inwardly disposed with respect to the inoperative position and extending at least partially over the open mouth of the die element, the fingers in their operative position bending the end portions of the ribbon around the side edges and over the top of the blank with which it is associated. Movement of these fingers between their operative and inoperative positions is accomplished by means of a simple and inexpensive mechanical linkage very readily incorporated into the machine of the aforementioned application without requiring any appreciable modification of that machine and without interfering in any way with the mode or efficiency of functioning thereof.

A feature of the machine of the aforementioned application is the employment of a flow of air for infolding the side edges of each of the individual blanks which constitutes the puff. The apparatus of the present invention is so constructed and so coacts with the other elements of the machine that while the flow of air still infolds the side edges of the blank, that air flow does not cause the end portions of the ribbon to be infolded at the same time. Instead, those end portions are retained in substantially upright condition until such time in the cycle of operation as it is desired that they be infolded for best results. While this mode of interaction and cooperation between the ribbon folding attachment of the present invention and the other elements of the machine of the aforementioned application constitutes an important point of novelty and invention insofar as the present improvement is concerned, it must nevertheless be borne in mind that the folding apparatus here disclosed and claimed has great utility in machines other than that of the aforementioned application, and therefore that in its broader aspects the apparatus here disclosed is inventive per se and apart from the above described specific mode of cooperation.

The simplicity and inexpensiveness of the apparatus needed to carry out the method of the present invention, when compared to the complexity of the task which it performs, particularly when the importance of accurate timing in the performance of that function is realized, and the efficiency and positiveness with which it carries out its designed functions without requiring any attention on the part of the operator, amply emphasize the commercial significance and inventiveness of the instant application.

To the accomplishment of the above objects, and to such other objects as may hereinafter appear, the present invention relates to a method for forming powder puffs or the like in which a ribbon is incorporated, as defined in the appended claims and as described in this specification, taken together with the accompanying drawings, in which:

Fig. 4 is a cross sectional view, on an enlarged scale, showing one die element in forming position, a portion of the carriage positioned thereabove in loading position with a ribbon and powder puff blank in position thereon, and the forcing means in operative position over the die element;

Figure 1:
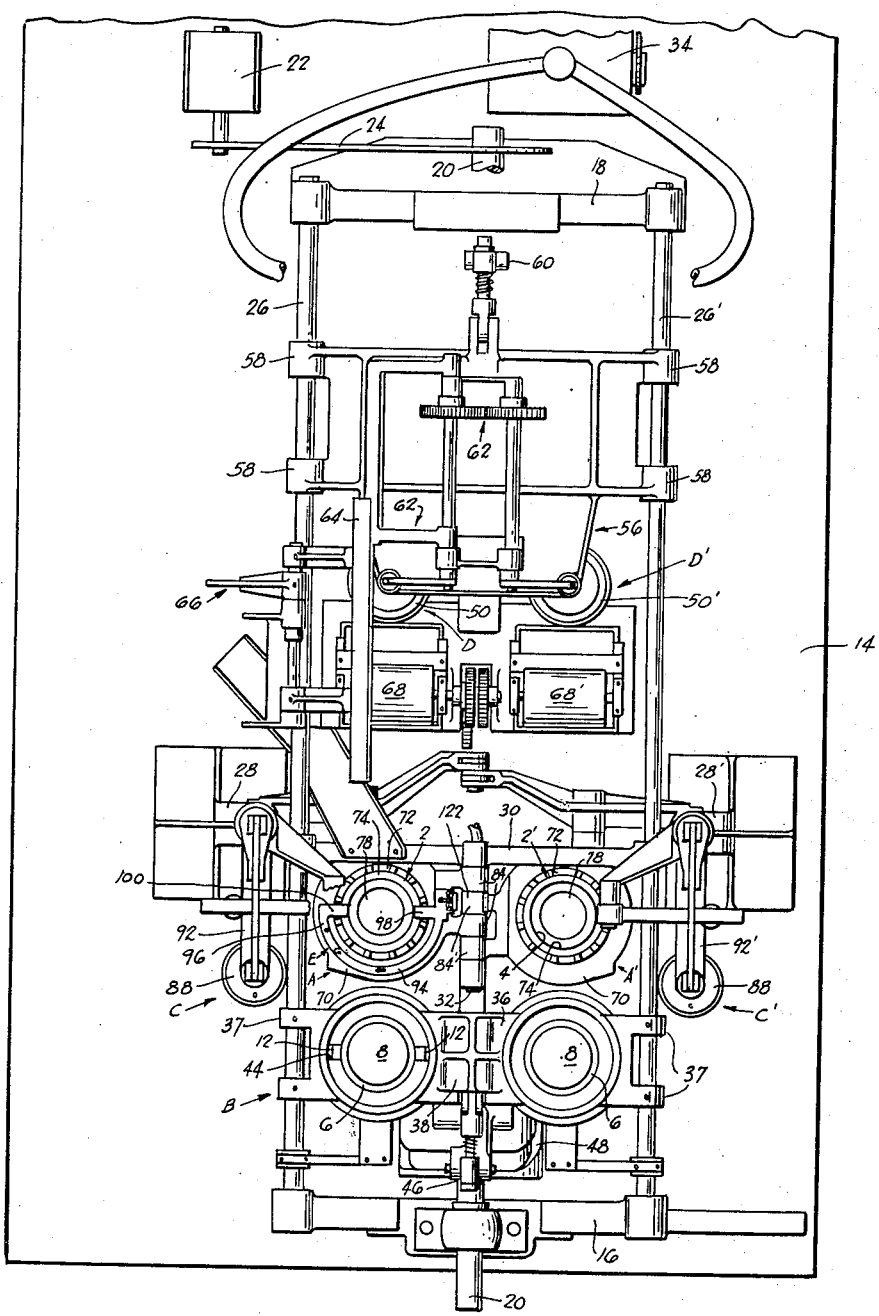
Fig. 1 is a top plan view, partially broken away, showing a machine of the type disclosed in the aforementioned application Serial No. 178,234 in which the present invention is embodied, blanks and ribbon being in place on both sides of the carriage.

Figs. 5 and 6 are cross sectional views, on a reduced scale, of the components of Fig. 4 showing those components in various positions which they assume during the forcing of the powder puff blank and the ribbon into the die casing, Fig. 5 illustrating the position which the parts assume immediately before the upwardly projecting side edges of the powder puff blank are inbent and Fig. 6 illustrating the position which the parts assume immediately after said side edges are inbent;

Fig. 7 is an end view, partially in cross section and with parts broken away, showing a portion of the machine after the operation illustrated in Fig. 6, the two die elements being in forming position and the gluing means being in position for depositing glue on the inbent periphery of the blank; and Figs. 8, 9, 10 and 11 are schematic views illustrating the operation of the folding attachment and the means actuating said attachment while the die elements are moved from forming to assembling position and back again, Fig. 8A showing the die elements in forming position, Fig. 9A showing the die elements almost in assembling position, Fig. 10A showing the die elements in assembling position, and Fig. 11A showing the die elements in an intermediate position on their way from assembling to forming position. Figs. 8B, 9B, 10B and 11B are views corresponding to Figs. 8A, 9A, 10A and 11A respectively but showing the relative positions of and interaction between the moving means for the folding attachment and the actuating means therefor. Figs. 8C, 9C, 10C and 11C correspond to Figs. 8A, 9A, 10A and 11A respectively and represent plan views of the left hand die elements looking down on the top face thereof, showing the position which the various parts of the folding attachment assume when that die element is in the position illustrated in Figs. 8A, 9A, 10A and 11A respectively.

The instant invention will be here disclosed in conjunction with a machine of the type disclosed in the aforementioned application Serial No. 178,234, but it will be understood that significant aspects of its inventiveness are not dependent upon its use with that machine. Since the elements of that machine are described with considerable detail in the aforementioned application, Serial No. 178,234, they will be here disclosed only generally, detailed description being reserved for those components which form a part of or directly cooperate with the instant invention. Accordingly, the general description of the machine which immediately follows should be considered merely as outlining an environment in which the present invention can function, but without in any way limiting the broad aspects of the present invention to that environment.

The machine here disclosed comprises a plurality of operative components arranged and movably mounted on a suitable frame. These components include a pair of forming mechanisms A, A', each including a die element 2, 2' having an open mouth 4 into which powder puff blanks are insertable. In the form here specifically disclosed, each of these blanks comprises a casing element 6 having a diameter greater than that of the open mouths 4 of the die elements 2, 2', and a wad of padding or stuffing 8 receivable in said casing element 6 and slightly smaller in diameter than said open mouth 4. The forming mechanisms A, A' are movable between a forming position in which their open mouths 4 are exposed (Figs. 1, 2 and 8A) and an assembling position in which their open mouths abut (Fig. 10A). The powder puff casing blanks are individually movable into the forming mechanisms A and A' so as to take a desired configuration, and a ribbon 10 or other strip material is adapted to be inserted into one of the forming mechanisms, here shown as the lefthand mechanism A, so as to be associated with the powder puff blank in said forming mechanism A.

A carriage B is movable between a loading position (Figs. 1 and 2) remote from the forming mechanism A, A' when those mechanisms are in forming position, and a delivering position over the exposed open mouths 4 of the forming mechanisms A and A' (Figs. 4, 5 and 6). The individual powder puff blanks 6, 8 and the ribbon 10 are placed upon the carriage B when that carriage is in loading position, the carriage being suitably shaped so as to facilitate placement of the blanks and ribbons thereon in accurately oriented position, the carriage B in moving to delivering position carrying the blanks 6, 8 and ribbon 10 therewith and accurately positioning them over the exposed open mouths 4 of the forming mechanisms A, A'.

Forcing means C, C' are provided for automatically forcing the blanks from the carriage B into the forming mechanisms A, A' and for forcing the ribbon 10 into the forming mechanism A in properly oriented position with respect to the corresponding blank. The forcing means C, C' are movable between an inoperative position remote from the forming mechanisms A, A' (Fig. 1) and an operative position over the carriage B in delivering position and the forming mechanisms A, A' in forming position. (Figs. 4, 5 and 6). When the forcing means C, C' are in operative position they are movable toward and into the open mouths 4 of the forming mechanisms A, A' so as to force the powder puff blanks 6, 8 and the ribbon 10 from the carriage B into the forming mechanisms A, A', the forcing means C, C' then being movable out of and away from the open mouths 4 of the forming mechanisms A, A' so as to permit the carriage B to return to loading position and permit the forcing mechanisms C, C' themselves to be returned to inoperative position.

Gluing means D, D' are provided, those means being movable between a glue-obtaining position remote from the forming mechanisms A, A' (Fig. 1) and a glue-depositing position over the open mouths 4 of the forming mechanisms A, A' (Fig. 7), the gluing means D, D' in glue-depositing position being reciprocable toward and away from the forming mechanisms A, A' so as to deposit glue upon the upper surfaces of the blanks held therein.

In the preferred mode of operation here specifically disclosed, the forcing means C, C', after they have moved the ribbon 10 and the powder puff blanks 6, 8 with which that ribbon is associated into the forming mechanism A, act to facilitate the inbending of the side edges of the casing element 2 over and around the stuffing 8, while at the same time ensuring that the end portions 12 of the ribbon 10 remain substantially upright. Similarly, the gluing means D which applies adhesive to the upper portion of the blank in the forming mechanism A does so while the ribbon end portions 12 continue to extend upwardly. The gluing means D, D' are then returned to a position remote from the forming mechanisms A, A', after which said forming mechanisms A, A' are moved to assembling position (Fig. 10A).

A ribbon folding attachment, generally designated E, is provided on the forming mechanism A into which the ribbon 10 is inserted, that attachment being active upon the upwardly extending ribbon ends 12 at an appropriate time in the cycle of operation so as to bend those ends over the upper surface of the blank with which it is associated. This is done before the forming mechanisms A, A' reach their assembling position, so that the ribbon 10 may be secured to the powder puff via its ends 12 at the same time that the two blanks of which the puff is composed are united. The infolding of the ribbon end portions 12 is preferably performed after adhesive has been applied to the upper surface of the blank with which it is associated, that infolding action being here disclosed as occurring while the forming mechanisms A and A' are on their way to assembling position. After the blanks have been united and the ribbon end portions 12 have been secured therebetween, the forming mechanisms A, A' are again moved to forming position, the completed powder puff with ribbon attachment is removed, and a new cycle of operation of the machine commences, the carriage B again moving from loading to delivering position.

Now describing the machine in a somewhat more particularized manner, the supporting frame thereof may comprise a sturdy bed plate 14 upon which all of the components of the machine are mounted. A pair of standards 16 and 18 extend from each end of the bed plate 14 to an appropriate height, preferably such that a seated operator can have ready access to the top of the apparatus. A cam shaft 20 is journaled in the lower portions of the standards 16 and 18, that shaft being rotated by motor 22 via operative connection 24 which may take the form of a sprocket chain, belt, gear train or the like. At the top of the standards 16 and 18 a pair of spaced horizontal guide rods 26, 26' are mounted, the carriage B and gluing means D, D' being slidable along those guide rods between their various positions. Vertical standards generally designated 28 and 28' are positioned outside the guide rods 26, 26', the forcing means C, C' being mounted thereon so as to pivot about a vertical axis between their inoperative and operative positions and so as to be slidable reciprocably in a vertical direction when in operative position. A cross bar 30 extends between the guide rods 26, 26' adjacent the vertical standards 28, 28' and a horizontal shaft 32 is mounted thereon at right angles thereto, the forming mechanisms A, A' being pivotally mounted on the shaft 32 so as to be movable between forming and assembling positions. The shaft 32 is approximately on the same level as the guide rods 26, 26' so that the carriage B and the gluing means D, D' can be guided by the rods 26, 26' in their motion without being obstructed. It will be noted that the loading position of the carriage is on one side of the forming mechanisms A, A' while the glue-obtaining position of the gluing means D, D' is on the other side thereof.

Also mounted on the bed plate 14 is an air suction pump 34 the suction end of which is connected to the forming mechanisms A, A' via a suitable control arrangement.

Figure 2:
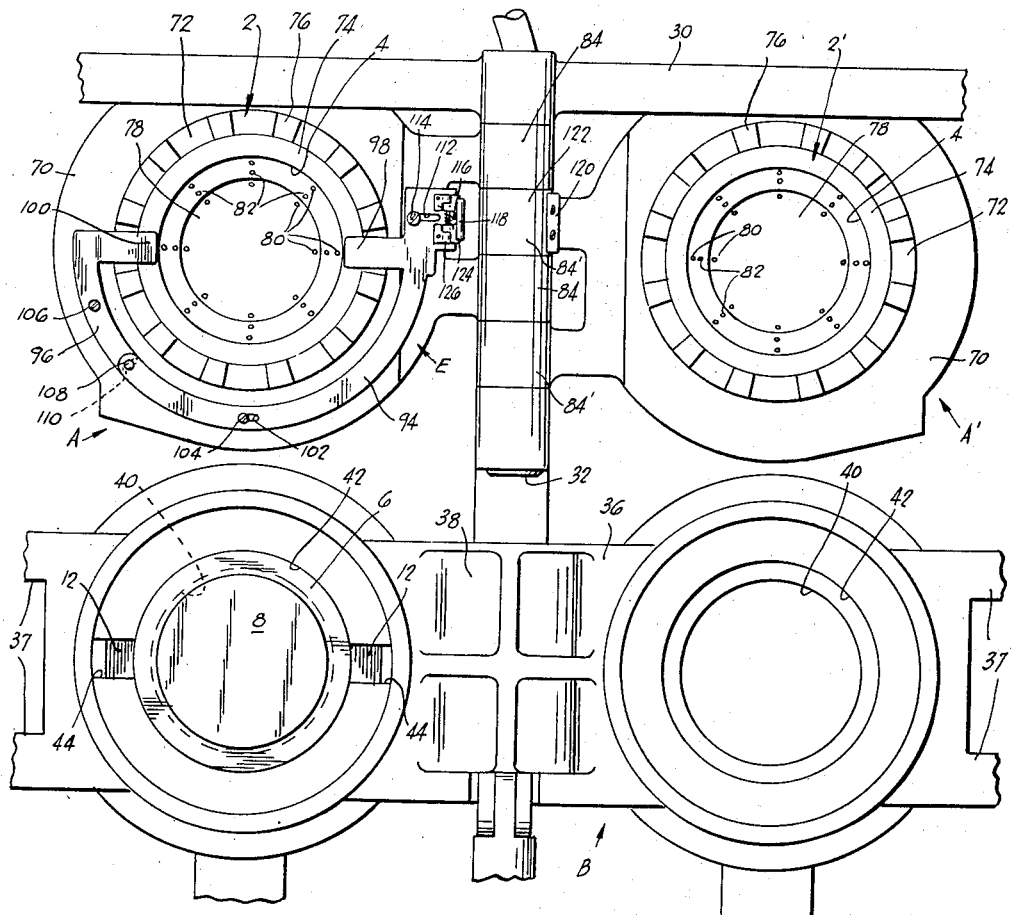
Fig. 2 is a fragmentary top plan view, on an enlarged scale, of a portion of the machine of Fig. 1, showing the die elements in forming position and the carriage in loading position, the left hand portion of the carriage having a blank and a ribbon in place therein and the right hand portion of the carriage being empty.

The carriage B, details of which can best be seen in Fig. 2, comprises a plate 36 mounted on the guide rods 26, 26' by means of collars 37 so as to be slidable therealong and provided with a central raised portion 38 adapted to clear the shaft 32 when the carriage is in delivering position. On either side of the raised portion 38 are a pair of apertures 40 smaller than the diameter of the casing element 6 but larger than the diameter of the stuffing 8, recesses 42 being formed around the apertures 40 and having a diameter closely similar to that of the casing element 6. The lefthand upper portion of the plate 36 is also provided with a pair of diametrically opposed and radially oriented recesses 44 of a width closely similar to that of the ribbon 10. Thus the ribbon 10 may be placed on the lefthand part of the carriage B in flat condition and extending over the aperture 40, the end portions 12 thereof being received within recesses 44, the casing elements 6 may also be placed on the carriage B in flat condition so as to be received within the recesses 42, and the wad of padding 8 which may also form a part of the powder puff blank may then be centered on top of the casing element 6. When the carriage B is in its delivering position (Figs. 4, 5 and 6) the apertures 40 are in accurate registration with the open mouths 4 of the forming mechanisms A, A'. Since the wad of padding 8 has a diameter somewhat smaller than that of the aperture 40, the powder puff blanks and the ribbon 10 may be forced through the apertures 40 and moved smoothly and easily into the forming mechanisms A, A'. The carriage B is moved between its loading and delivering positions by means of an appropriate operative connection generally designated 46 between the carriage B and a cam 48 mounted on the cam shaft 20.

The gluing means D and D' are similar in construction. Each consists of a cup-shaped member 50, 50' the downwardly depending flange 52 of which is approximately of the same size and shape as the powder puff casing blanks in the die element 2, 2', the members 50, 50' being preferably adapted to pass between the upstanding end portions 12 of the ribbon 10 when that ribbon and the blank with which it is associated are inserted into the die element 2, as may best be seen from Fig. 7. Each of the cups 50, 50' is mounted on a rod 54 vertically reciprocable within carriage 56, the carriage in turn being slidably mounted on the guide rods 26, 26' by means of collars 58 and being moved therealong by an operative connection generally designated 60 between the carriage 56 and an appropriate cam (not shown) on the cam shaft 20. The members 50 are vertically reciprocated when the carriage 56 is in glue-depositing position over the open mouths 4 of the forming mechanisms A, A' between the solid line position shown in the lefthand portion of Fig. 7 and the broken line position there illustrated, that motion being accomplished by means of a tappet and gear linkage generally designated 62 connected to channel-shaped member 64 which is suitably actuated by an operative connection generally designated 66 between the channel-shaped member 64 and an appropriate cam (not shown) on the cam shaft 20. A pair of glue applicators 68, 68' are positioned in the path of the members 50, 50' as they move from the position shown in Fig. 1 to the glue-depositing position shown in Fig. 7, adhesive being picked up therefrom by the lower surfaces of the downwardly depending flanges 52 on the members 50, 50', that adhesive being transferred to the upper surfaces of the blanks in the forming mechanisms A and A' when the members 50, 50' are moved to the position shown in broken lines in Fig. 7.

The forming mechanisms A and A' may be substantially identical, and consequently a detailed description of one will suffice for both. Each comprises a ring-like support 70 in which the die element 2 is secured. Each die element 2 comprises a supporting shell 72 with a ring 74 secured therein the upper portion of which defines the open mouth 4 of the die element. The upper surfaces of the shell 72 and ring 74 are flat, substantially coplanar, and substantially perpendicular to the open mouth 4. Upward projections 76 are provided around the open mouth 4 on the upper surface of the ring 74. A bottom wall 78 is provided below the open mouth 4, that wall being preferably, although not essentially insofar as the present invention is concerned, vertically movable with respect to the open mouth 4. It is provided with a plurality of orifices 80 therethrough so that suction exerted therebelow inside the shell 72 via appropriate connections to the air suction pump 34 will act upon the powder puff elements positioned thereabove, and is further provided with a ring of upstanding pins 82 which tend to grasp the casing blank 2, and the ribbon 10, when that blank or ribbon is moved into the die element A, so as to prevent them from shifting their position.

In order to provide for motion of the forming mechanisms A and A' between their forming and assembling positions, each of the supports 70 is provided with spaced ears 84, 84', the ears 84 of the forming mechanism A fitting between the ears 84' of the forming mechanism A' and the ears thus interfitted being received over shaft 32 so that the shaft 32 constitutes a pivotal axis for the forming mechanisms A and A'. Those mechanisms are pivotal about the shaft 32 between the forming position in which they are on opposite sides of the shaft 32 and in which their open mouths there abut (Fig. 10A). They are and the assembling position in which they are both on the same side of the shaft 32 and their open mouths there about (Fig. 10A). They are moved between forming and assembling positions by means of an operative connection generally designated 86 (see Fig. 7) between themselves and an appropriate cam (not shown) on cam shaft 20.

Each of the forcing means C and C' comprises a cup-like shell 88 and a plunger 90 snugly receivable within the shell and independently movable with respect thereto. The outer dimensions of the shell 88 are such that it will pass through the aperture 40 in the carriage B and will also be movable into the open mouth 4 of the die element 2, preferably being received within the die element 2 with sufficient clearance at the sides thereof so as not to interfere with the upwardly extending ribbon end portions 12. The plunger 90 is necessarily smaller in outer dimensions than the shell 88 and is preferably of a size comparable to that of the wad of padding 8 which forms a part of the powder puff blank. The shell 88 and plunger 90 are mounted at the end of arms 92, 92' (see Fig. 1) so as to be movable with those arms between the inoperative position shown in Fig. 1, in which the forcing means C, C' are remote from the forming mechanisms A, A', and the operative position disposed above the open mouths 4 of the forming mechanisms A, A', as illustrated in Figs. 4, 5 and 6. In the operative position the shell 88 and plunger 90 are independently reciprocable toward, into and away from the forming mechanisms A, A'. These motions are all accomplished through appropriate operative connections with cams (not shown) mounted on the cam shaft 20. As in the case of the other operative connections heretofore generally referred to, reference may be had to the aforementioned application Serial No. 178,234 for a specific linkage which has been found useable for this purpose.

The folding attachment E is shown as embodied in only one of the forming mechanisms, to wit, the forming mechanism A, since it is usually the case that a single ribbon extending over only one face of the completed powder puff is desired, but it will be understood that if ribbons are to be affixed to a structure so as to extend over both sides thereof, a similar attachment E could also be applied to the forming mechanism A', or to any other forming mechanism with which it may be associated. It comprises a pair of arms 94 and 96 of arcuate shape articulately mounted on the forming mechanism A and having fingers 98 and 100 which extend toward the open mouth 4 of the die element 2. More specifically, each of the arms 94 and 96 is pivotally mounted on the upper surface of the support 70 outside the spaced projections 76 on the upper surface of the ring 74, the fingers 98 and 100 extending inwardly toward the open mouth 4 between adjacent projections 76. The arm 94 is arcuate, partially surrounds the open mouth 4, and is provided at a point intermediate its length with an elongated slot 102 within which screw 104 is received, the screw being secured to the support 70 and defining the axis about which the arm 94 can pivot, said arm 94, by virtue of the elongated nature of the slot 102, also being capable of translation in a direction parallel to the plane of the upper surface of the support 70. The arm 96 is also arcuate, partially surrounds another portion of the open mount 4, and is pivotally secured to the upper face of the shell 72 by means of screw 106. The fingers 98 and 100 are attached to the arms 94 and 96 respectively at points remote from the pivotal axes of said arms so that when said arms are pivoted, the fingers 98 and 100 will move between inoperative positions shown in Figs. 2, 8C, 10C and 11C, in which position the fingers 98 and 100 are wholly outside the open mouth 4, and operative positions shown in Fig. 9C, in which the fingers 98 and 100 extend at least partially over the open mouth 4. The fingers 98 and 100 are positioned opposite the points where the ribbon end portions 12 extend upwardly and thus, in the embodiment here disclosed, will be directly under the slots 44 in the carriage B when that carriage is in delivering position.

The ends of the arms 94 and 96 overlap on the other side of their respective pivotal axes from the fingers 98 and 100 and a pin 108 in the end of arm 94 is received within slot 110 in the end of arm 96. By reason of this interconnection, movement of arm 94 will cause corresponding movement of arm 96, so that the fingers 98 and 100 will move in synchronized manner between operative and inoperative positions.

Figure 3:
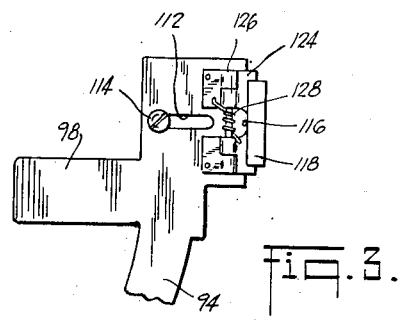
Fig. 3 is an enlarged fragmentary top plan view of a portion of one arm of the folding attachment.

In order to fix the operative and inoperative positions of the arms 94 and 96, the arm 94 is provided with another elongated slot 112 (see Figs. 2 and 3) through which screw 114 passes, the screw 114 being secured to the support 70. A spring 116 (see Fig. 8) is mounted on the side of the support 70 and extends upwardly into engagement with a portion of the arm 94, the spring being active upon that arm to urge it to pivot in a clockwise direction about the pin 104 to the fullest extent permitted by screw 114 and slot 112, this defining the inoperative position of the folding mechanism.

For moving the arms 94 and 96 and their fingers 98 and 100 to operative position, a cam follower 118 is mounted on the arm 94 so as to be cooperable with cam 120 mounted on the hub 122 defined by one of the ears 84' of the forming mechanism A'. The cam follower 118 is mounted on leaf 124 which is in turn pivotally mounted at 126 with respect to the arm 94. A spring 128 (see Fig. 3) urges the leaf 124 to a horizontal position parallel to the arm 94, and the cam follower 118 will therefore be rigid with respect to the arm 94 insofar as pressures in the plane of motion of the arm 94 and pressures downwardly with respect thereto are concerned. However, the cam follower 118 can be moved against the action of the spring 128 in an upward direction substantially perpendicular to the plane of the movement of the arm 94 (see Fig. 11B) without transmitting that motion to the arm 94, this being accomplished through pivoting of the leaf 124 about the axis 126. The cam 120 on the hub 122 is defined by an inclined face 130 and an abrupt drop 132, the cam 120 being adapted to be moved into engagement with the cam follower 118 while the forming mechanisms A and A' are moving toward their assembling position in such a direction as to cause the cam follower 118 to ride along the inclined surface 130 from the low point to the high point thereof, thus moving the arms 94 and 96 to their operative position, and then, urged by the spring 116, and when the abrupt drop 132 has passed the cam follower 118, to move back to inoperative position. When the forming mechanisms A and A' move from assembling back to forming position, the abrupt drop 132 of the cam 120 engages the cam follower 118 in such a direction as to cause the leaf 124 to pivot with respect to the arm 94, thus permitting the forming mechanisms A and A' to resume their forming positions without moving the arms 94 and 96.

It will be seen that, apart from providing the grooves 44 in the lefthand portion of the carriage B, which can be used or not as desired depending upon whether a ribbon 10 is used or not, no other modification of the machine of application Serial No. 178,234 is required except for the securing of the arms 94 and 96 to the upper face of the die element 2 and the securing of cam 120 on the arm 84' which defines the hub 122. The arms are secured in place by means of three screws 104, 106 and 114, and the cam 120 can also be secured in place through the use of screws, so that the arms and cam are all removable at will. Thus a given machine can readily be converted between use with a ribbon and use without a ribbon, and this conversion can be accomplished even by an unskilled person and without requiring any modification or adjustment whatsoever of the closely correlated cams and controls which move the components of the machine per se in accurately timed relationship.

While the mode of operation of the ribbon folding attachment and the manner in which it cooperates with the other components of the machine with which it is illustrated will in the main be apparent from the above description, it nevertheless seems desirable to describe a complete cycle of operation. The cycle starts with the carriage B in loading position, the forming mechanisms A, A' in forming position, the forcing means C, C' in inoperative position, and the gluing means D, D' in their position remote from the forming means A, A', all as illustrated in Fig. 1. The operator, who is located at the lower end of the machine as viewed in Fig. 1, will first place the ribbon 10 across the lefthand aperture 40 of the carriage B so that the ribbon end portions 12 rest in the slots 44. The operator will then place casing blanks 6 within the recesses 42 of the carriage B, the wads 8 of padding or stuffing being then placed on top of the casing blanks 6. The carriage B then moves to delivering position, the apertures 40 registering with the open mouths 4 of the forming mechanisms A, A', and the forcing means pivot to operative position over the apertures 40 in the carriage B. The shell 88 and plunger 90 then move downwardly through the apertures 40 in the carriage B, thus forcing the casing blanks 6, stuffing 8, and ribbon 10 down through the apertures 40 and into the open mouths 4 of the die elements 2 and 2'. The plunger 90 starts out somewhat in advance of the shell 88, as shown in Fig. 4, and after the powder puff blanks have been moved through the apertures 40 in the carriage B the plunger 90 advances more rapidly than the shell 88 until the parts assume the relative positions shown in Fig. 5. Since the plunger 90 is approximately of the size of the wad of stuffing 8, and since the casing blank 6 is greater in diameter than the wad of stuffing 8 and is also greater in diameter than the open mouth 4 of the die elements 2, the side edges of the casing blank 6 will extend upwardly around and beyond the sides of the stuffing 8, the entire casing blank being pressed into the die element 2 sufficiently so that the pins 82 will engage the blank and hold it in position. The side edges of the casing blank 6, as they extend upwardly, tend to surround the periphery of the plunger 90 and are positioned under the outer portion of the shell 88. Since the ribbon 10 is even longer than the diameter of the casing blank 6, its end portions 12 also extend upwardly when the ribbon is forced into the side element 2, those ribbon end portions 12 preferably being long enough so as to extend upwardly alongside and outside of the shell 88.

During the time that the powder puff blanks are being urged into the die elements 2, suction is exerted within those die elements via the orifices 80, thus aiding the movement of the powder puff blanks into the die element 2. This causes a flow of air into the die elements 2 which impinges against the upstanding side edges of the casing element 6 and tends to cause said edges to be inbent. While the plunger 90 assumes the position shown in Fig. 5, in which it is between the upstanding side edges of the casing element 6, that inbending cannot take place. However, when the plunger 90 is lifted the flow of air inwardly causes inbending of the upwardly extending side edges of the casing element 6 to take place, the plunger 90 and shell 88 thereafter coming down to the position shown in Fig. 6, in which they press down the inbent casing element side edges. It will be noted that in this position the ribbon end portions 12 are still outside the shell 88 and hence, even though the inflow of air above mentioned might tend to inbend the ribbon end portions 12, the shell 88 presents a positive impediment to that inbending. Furthermore, the nature of the material of which the ribbon 10 is composed is such that it will resist inbending more than the soft material of which the casing element 6 is usually made.

The plunger 90 and shell 88 then withdraw from the die element 2 and the aperture 40 in the carriage B, the forcing means C, C' pivot to inoperative position, the carriage B moves back to loading position, and the gluing means D, D' move toward the forming mechanisms A, A', picking up glue from the glue pots 68, 68' on the way. When the cup-shaped members 50, 50' have reached a position over the die elements 2, 2', they are moved downwardly so as to transfer adhesive from their lower surface to the upper surfaces of the inbent side edges of the casing element 6. The ribbon end portions 12 preferably still extend upright during this operation, the cup-shaped members 50 passing freely between said upstanding ribbon end portions 12 as may be clearly seen from Fig. 6.

The gluing means D, D' then return to their positions shown in Fig. 1, and the forming mechanisms A, A' are pivoted about the shaft 32 so as to move from the forming position shown in Fig. 8A upwardly to the assembling position shown in Fig. 10A and then back to their forming positions. When the forming mechanisms A, A' are in their assembling positions they press the adhesived upper surfaces of the inbent side edges of the casing elements 2 against one another so as to secure the two powder puff blanks together and define a single composite powder puff.

The ribbon is made a part of the powder puff through the action of the ribbon folding attachment E, that attachment serving, at any appropriate point in the cycle of the operation of the machine, to fold the upstanding ribbon end portions 12 over the powder puff blank with which it is associated, this action occurring before the two blanks are pressed together so that the ribbon end portions 12 are adhesively secured between the powder puff blanks at the same time that those blanks are secured to one another. It is advantageous to postpone the infolding of the ribbon end portions 12 until the upper surface of the powder puff blank with which it is associated has been provided with adhesive, so that both surfaces of the ribbon end portions 12 will be secured to the powder puff blanks on either side of them by a layer of adhesive.

The ribbon folding attachment E here specifically disclosed folds the ribbon end portions 12 inwardly while relative motion occurs between the forming mechanism A on which the attachment E is secured and some other part of the machine, here shown as the other forming mechanism A'. As the two forming mechanisms move from their forming positions shown in Fig. 8 toward their assembling position shown in Fig. 10, the cam 120 secured to the hub 122 moves into engagement with the cam follower 118 in a downward direction relative to the face of the die element 2. Since the cam follower 118 cannot move with respect to the arms 94 in that direction, the cam follower 118 rides along the inclined surface 130 of the cam 120 (see Figs. 9A, B and C) and thus positively forces the arm 94 to pivot in a counter-clockwise direction about the screw 104 and to translate slightly inwardly with respect thereto, thus bringing the finger 98 over the open mouth 4 of the die element 2 and folding down the upstanding ribbon end portion 12 thereadjacent. The pin and slot interconnection 108, 110 between the arm 94 and the arm 96 will cause the arm 96 to pivot in a clockwise direction about the screw 106, thus bringing the finger 100 over the open mouth 4 of the die element 2 so as to fold down the other ribbon end portion 12. As the forming mechanisms A, A' continue toward their assembling position, the high point of the cam 120 passes the cam follower 118 (see Figs. 10A, B and C). The spring 116 thus urges the cam follower outwardly, this action moving the arms 94 and 96 and their fingers 98 and 100 back to inoperative position.

After the powder puff blanks and the ribbon have been united, the forming mechanisms A, A' return to their forming position. During this motion the cam 120 must once again move past the cam follower 118, but this time the abrupt drop on the cam 120 engages the cam follower 118 and moves it upwardly with respect to the arm 94, this motion being permitted by reason of the pivotal mounting of the leaf 124 on the arm 94. Hence, as the forming mechanisms A, A' return to their forming position, the arms 94 and 96 and their respective fingers 98 and 100 remain in inoperative position, so as not to interfere with or mar the complete powder puff which now extends well above the open mouth 4 of the die element 2. The completed powder puff is retained in one of the forming mechanisms, here shown as the mechanism A (see Fig. 11C), and is removed therefrom at an appropriate time.

The folding attachment of the present invention is positive in operation, extremely simple in construction and readily attached to and detached from the machine with which it is associated. While the structural details of the folding attachment are significant in and of themselves, and while certain inventive aspects are presented by the specific mode of operation which the attachment exhibits with respect to the powder puff forming machine of application Serial No. 178,234, the inventiveness of the disclosure has broader aspects, and consequently changes may be made in specific structural details and in the environment in which the attachment operates without departing from the spirit of the invention as defined in the following claims.

I claim:

1. The method of forming a composite article of the character described with a ribbon incorporated therein from a pair of blanks and a strip of ribbon, which comprises forcing each of said blanks into a die element smaller than said blanks so that said blanks take the contour of said die elements, portions of the side edges of said blanks thus extending upright within said die element, positioning a ribbon under one of said blanks in its die element, said ribbon having end portions extending upwardly outside the side edges of said blank, infolding the side edges of said blanks while retaining said ribbon end portions in upwardly extending position, applying adhesive to said infolded side edges while retaining said ribbon end portions in upwardly extending position, folding said ribbon end portions over the infolded side edges of the blank with which it is associated and to which adhesive has been applied, and moving said die elements together so as to press said infolded side edges of said blanks against one another with said ribbon end portions therebetween, thereby uniting said blanks and said ribbon.

2. The method of forming a composite article of the character described with a ribbon incorporated therein from a pair of blanks and a strip of ribbon, which comprises forcing each of said blanks into a die element smaller than said blanks so that said blanks take the contour of said die elements, portions of the side edges of said blanks thus extending upright within said die element, positioning a ribbon under one of said blanks in its die element, said ribbon having end portions extending upwardly outside the side edges of said blank, infolding the side edges of said blanks while retaining said ribbon end portions in upwardly extending position, applying adhesive to said infolded side edges while retaining said ribbon end portions in upwardly extending position, moving said die elements together so as to press together said infolded side edges of said blanks to which adhesive has been applied, and folding said ribbon end portions over said infolded side edges of the blank with which it is associated while one of said die elements is moving toward the other and before said infolded side edges of said blanks are pressed together, thereby uniting said blanks and said ribbon.

3. The method of forming a composite article of the character described with a ribbon incorporated therein from a pair of blanks and a strip of ribbon, which comprises positioning each of said blanks over the open mouth of a die element, positioning a ribbon between one of said blanks and its associated die element with the end portions of the ribbon extending beyond the periphery of the blank, forcing each of said blanks into its respective die element by means of a central plunger having an outer diameter at least as small as the outer diameter of the blank in the die element, the end portions of said ribbon thus extending upwardly outside said plunger, withdrawing said plunger, applying adhesive to the upper portions of said blanks while retaining said ribbon end portions in upwardly extending position, folding the ribbon end portions over said upper portion of the blank with which it is associated and to which adhesive has been applied, and moving said die elements together so as to press said upper portions of said blanks against one another with said ribbon end portions therebetween, thereby uniting said blanks and said ribbon.

4. The method of forming a composite article of the character described with a ribbon incorporated therein from a pair of blanks and a strip of ribbon, which comprises positioning each of said blanks over the open mouth of a die element, positioning a ribbon between one of said blanks and its associated die element with the end portions of the ribbon extending beyond the periphery of the blank, forcing each of said blanks into its respective die element by means of a central plunger having an outer diameter at least as small as the outer diameter of the blank in the die element, the end portions of said ribbon thus extending upwardly outside said plunger, withdrawing said plunger, applying adhesive to the upper portions of said blanks while retaining said ribbon end portions in upwardly extending position, moving said die elements together so as to press said upper portions of said blanks to which adhesive has been applied against one another, and folding said ribbon end portions over said upper portion of the blank with which it is associated while one of said die elements is moving toward the other and before said upper portions of said blanks are pressed together, thereby uniting said blanks and said ribbon.

5. The method of forming a composite article of the character described with a ribbon incorporated therein from a pair of blanks and a strip of ribbon, which comprises positioning each of said blanks over the open mouth of a die element, said blanks being larger in diameter than said open mouth, positioning a ribbon between one of said blanks and its associated die element with the end portions of the ribbon extending beyond the periphery of the blank, forcing each of said blanks into its respective die element by means of a central plunger having an outer diameter at least as small as the outer diameter of the blank in the die element, portions of the side edges of said blank thus extending upright within said die element and the end portions of said ribbon extending upwardly outside said plunger and the side edges of said blank, infolding the side edges of said blanks while retaining said plunger between said upwardly extending ribbon end portions, said plunger thereby retaining said ribbon end portions in upwardly extending position, withdrawing said plunger, applying adhesive to the infolded side edges of said blanks while retaining said ribbon end portions in upwardly extending position, folding said ribbon end portions over the infolded side edges of the blank with which it is associated and to which adhesive has been applied, and moving said die elements together so as to press said infolded side edges of said blanks against one another, with said ribbon end portions therebetween, thereby uniting said blanks and said ribbon.

6. The method of forming a composite article of the character described with a ribbon incorporated therein from a pair of blanks and a strip of ribbon, which comprises positioning each of said blanks over the open mouth of die element, said blanks being larger in diameter than said open mouth, positioning a ribbon between one of said blanks and its associated die element with the end portions of the ribbon extending beyond the periphery of the blank, forcing each of said blanks into its respective die element by means of a central plunger having an outer diameter at least as small as the outer diameter of the blank in the die element, portions of the side edges of said blank thus extending upright within said die element and the end portions of said ribbon thus extending upwardly outside said plunger, infolding the side edges of said blanks while retaining said plunger between said upwardly extending ribbon end portions, said plunger thereby retaining said ribbon end portions in upwardly extended position, withdrawing said plunger, applying adhesive to the infolded side edges of said blanks while retaining said ribbon end portions in upwardly extending position, moving said die elements together so as to press said infolded side edges of said blanks to which adhesive has been applied against one another, and folding said ribbon end portions over said infolded side edges of the blank with which it is associated while one of said die elements is moving toward the other and before said infolded side edges of said blanks are pressed together, thereby uniting said blanks and said ribbon.

References Cited in the file of this patent

UNITED STATES PATENTS

| Number | Name | Date |
|---|---|---|
| 2,159,227 | Reiffert et al. | May 23, 1939 |
| 2,484,336 | Epstein et al. | Oct. 11, 1949 |
| 2,580,075 | Clark et al. | Dec. 25, 1951 |

FOREIGN PATENTS

| Number | Country | Date |
|---|---|---|
| 326,928 | Great Britain | Mar. 27, 1930 |
| 666,041 | Great Britain | Feb. 6, 1952 |